US009973128B2

(12) United States Patent
Yamaguchi et al.

(10) Patent No.: US 9,973,128 B2
(45) Date of Patent: May 15, 2018

(54) CONTROL DEVICE

(71) Applicant: MEIDENSHA CORPORATION, Tokyo (JP)

(72) Inventors: Takashi Yamaguchi, Ota (JP); Yugo Tadano, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 226 days.

(21) Appl. No.: 14/917,714

(22) PCT Filed: Sep. 25, 2014

(86) PCT No.: PCT/JP2014/075351
§ 371 (c)(1),
(2) Date: Mar. 9, 2016

(87) PCT Pub. No.: WO2015/046286
PCT Pub. Date: Apr. 2, 2015

(65) Prior Publication Data
US 2016/0218652 A1  Jul. 28, 2016

(30) Foreign Application Priority Data

Sep. 30, 2013  (JP) ................. 2013-203386

(51) Int. Cl.
*H02P 23/12* (2006.01)
*G05B 13/02* (2006.01)
*G05B 13/04* (2006.01)

(52) U.S. Cl.
CPC .............. *H02P 23/12* (2013.01); *G05B 13/02* (2013.01); *G05B 13/04* (2013.01)

(58) Field of Classification Search
CPC ....................................................... H02P 23/12
(Continued)

(56) References Cited

U.S. PATENT DOCUMENTS 5,936,369 A * 8/1999 Iwashita ............... G05B 19/19
318/609
6,259,226 B1   7/2001 Kaitani et al.

FOREIGN PATENT DOCUMENTS

JP        4-299085 A    10/1992
JP     2002-252991 A     9/2002
(Continued)

OTHER PUBLICATIONS

Yugo Tadano et al., Torque Ripple Suppression Control Based on the Periodic Disturbance Observer with a Complex Vector Representation for Permanent Magnet Synchronous Motors, IEEJ Transactions on Industry Applications, 2012, vol. 132, No. 1, pp. 84-93.

*Primary Examiner* — David S Luo
(74) *Attorney, Agent, or Firm* — Foley & Lardner LLP

(57) ABSTRACT

Periodic disturbance occurs in current etc. due to offset error and gain error of a current sensor used in a control device. A voltage command value is generated from a current command value and a current detection value by the current sensor in a current control section. The generated voltage command value is inputted to a plant model section, and a virtual current value is calculated. The virtual current value is inputted to a periodic disturbance observer via a coordinate transform section, and a compensation value is calculated. The compensation value is superimposed on the current detection value via a coordinate inverse-transform section, and the current detection value of the current sensor is corrected.

7 Claims, 8 Drawing Sheets

(58) Field of Classification Search
USPC .............................. 318/400.23, 400.01, 700
See application file for complete search history.

(56) References Cited

FOREIGN PATENT DOCUMENTS

| | | |
|---|---|---|
| JP | 3813637 B2 | 8/2006 |
| JP | 2013-183558 A | 9/2013 |
| WO | WO 2010/024195 A1 | 3/2010 |

* cited by examiner

CONTROL DEVICE

TECHNICAL FIELD

The present invention relates to a control device having an error correction function for a current sensor.

BACKGROUND ART

As a suppression control of occurrence of periodic disturbance, there are power system control in a power receiving and transforming facility, positioning control using a robot, axial torque resonance control for a dynamometer system, oscillation suppression of a motor casing (related to ride comfort of an electric vehicle, an elevator, or the like), and the like, and there is a demand for suppressing the periodic disturbance in the respective products with high accuracy.

For example, a motor generates a torque ripple by the principles of the motor, and this causes various problems such as oscillation, noise, an adverse effect on ride comfort, and electrical and mechanical resonance. Particularly, in a magnet embedded PM motor, a cogging torque ripple and a reluctance torque ripple are generated in a complex manner. As a countermeasure therefor, a periodic disturbance observer compensation method has been proposed as a control method of suppressing a torque ripple.

FIG. 8 illustrates a control block diagram regarding an n-th order torque ripple frequency component in a periodic disturbance observer which is disclosed in Patent Document 1 and Non-Patent Document 1.

A reference numeral 1 indicates a torque ripple compensation value calculation section. By multiplying differences between a control command rn (normally, 0) of a sine wave/a cosine wave and estimated values $dT_A\hat{}n$, $dT_B\hat{}n$ by a periodic disturbance observer 3 by a sine wave value/a cosine wave value respectively then by adding these multiplication values, the torque ripple compensation value calculation section generates a torque ripple compensation command Tc*n, and outputs it to a control target (control object) 2. In the control target 2, periodic disturbance (hereinafter, referred to as periodic disturbance dTn) may occur. For example, if a control target (an object to be controlled) is a motor, a torque ripple which is disturbance synchronized with a rotation speed due to a cogging torque corresponds to the periodic disturbance, and causes oscillation or noise.

The periodic disturbance observer 3 is an observer that suppresses the periodic disturbance dTn. By using a system identification model in which disturbance is expressed in a complex vector for each frequency component as an inverse system model of the disturbance observer, the periodic disturbance observer 3 directly estimates the disturbance of frequency of the control target and compensates for the disturbance.

With this compensation, it is possible to achieve a high suppression effect regardless of orders of a target frequency, although a control configuration is relatively simple.

Regarding acquisition of a system identification model $P\hat{}n$, system identification is previously performed for a plant Pn ($=P_An+jP_Bn$) of a control target (a plant Pn ($=P_An+jP_Bn$) that is an object to be controlled) in advance of a control, and the model is expressed by Equation (1) in the form of a one-dimensional complex vector.

$$P\hat{}n = P\hat{}_An + jP\hat{}_Bn \quad (1)$$

Here, the subscript n indicates an n-th order component, and any variable is a complex vector expressed as $Xn = X_An + jX_Bn$.

For example, in a case where system identification results from 1 Hz to 1000 Hz are expressed in a complex vector for each 1 Hz, a system can be expressed by using a table including 1000 one-dimensional complex vector elements. Alternatively, the system may be expressed by mathematical expression of the identification result. In either of these two methods, a system model for a specific frequency component can be expressed in a simple one-dimensional complex vector.

Here, not only the system identification model, but also $P\hat{}n$, rn, dTn, $dT\hat{}n$, and Tn mentioned in the above description are complex vectors expressed as $Xn = X_An + jX_Bn$.

Since a torque ripple of a motor is disturbance which is periodically generated according to a rotation phase θ [rad], as a control of the periodic disturbance observer 3, the periodic disturbance observer 3 performs conversion into a cosine coefficient $T_An$ and a sine coefficient $T_Bn$ of arbitrary order n (an integer multiple (or an integral multiple) of an electrical rotational frequency) by using torque pulsation frequency component extracting manner. Although there is Fourier transform etc. as an accurate measurement manner of a frequency component, simplicity is paramount in FIG. 8, and by causing plant output values to pass through low-pass filters $G_F(s)$ as one kind of simplification of the Fourier transform, a frequency component for suppression target of the periodic disturbance dTn is extracted. This extracted frequency component is multiplied by the inverse system expressed by the inverse number $P\hat{}n^{-1}$ of the extracted system identification model, the periodic disturbance dTn is estimated on the basis of differences from the control command values having passed through the low-pass filters $G_F(s)$ and is outputted to the torque ripple compensation value calculation section 1 as a periodic disturbance estimated value $dT\hat{}n$ ($=dT\hat{}_An + jdT\hat{}_Bn$), then the periodic disturbance dTn is suppressed by subtracting the estimated value from the control command rn.

Patent Document 1: International Publication No. WO2010/024195A1

Non-Patent Document 1: Torque Ripple Suppression Control Method based on Periodic Disturbance Observer with Complex Vector Representation for Permanent Magnet Synchronous Motors, IEEJ Journal of Industry Applications D, Vol. 132, No. 1, p. 84 to 93 (2012)

SUMMARY OF INVENTION

There are many factors of causing periodic disturbance in an inverter driving device as a control device, and offset and gain errors in a current sensor are one of the factors of causing periodic disturbance. The offset error mainly generates periodic disturbance of 1f of a synchronization frequency, and the gain error mainly generates periodic disturbance of 2f.

An object of the present invention is to provide a control device having a function of correcting gain and offset errors in a current sensor.

According to an aspect of the present invention, a control device generates, by a current control section, a voltage command value from a current command value and a current detection value by a current sensor, and the control device is configured so that the voltage command value is inputted to a plant model section and a virtual current value is calculated, the virtual current value is inputted to a periodic disturbance observer via a coordinate transform section and a compensation value is calculated in the periodic disturbance observer, the calculated compensation value is superimposed on the current detection value via a coordinate inverse-transform section, and the current detection value of the current sensor is corrected.

According to another aspect of the present invention, a current sensor error estimation section including an offset error calculation section and a gain error calculation section is provided, a value obtained by superimposing the compensation value on the current detection value and the current detection value are respectively inputted to the offset error calculation section and the gain error calculation section and an offset error and a gain error are calculated, and an error in the current sensor is estimated on the basis of respective calculated error signals.

According to still another aspect of the present invention, a current error operation section is provided on an output side of the current sensor, a memory that stores a current sensor error estimation value via a switch is provided on an output side of the current sensor error estimation section, a switch is connected to an output side of the compensation value from the periodic disturbance observer, and either the current sensor error estimation value stored in the memory or the compensation value from the periodic disturbance observer is outputted in a switching manner, and the current error operation section corrects the current detection value on the basis of the current sensor error estimation value stored in the memory when the switch connected to the memory is turned on.

According to still another aspect of the present invention, a control device that generates, by a current control section, a voltage command value from a current command value and a current detection value by a current sensor, and the current sensor performs two-phase detection, a current error operation section is provided on an output side of the current sensor, the voltage command value is inputted to a plant model section and a virtual current value is calculated, the virtual current value is inputted to a periodic disturbance observer via a function component detection section, a compensation value calculated by the periodic disturbance observer and the virtual current value are inputted to a compensation value/error transform section and a current sensor error estimation value is calculated, and the current sensor error estimation value is inputted to the current error operation section and the current detection value of the current sensor is corrected.

According to still another aspect of the present invention, an output side of the periodic disturbance observer is connected to the current error operation section via a switch, a memory that stores the compensation value is provided on the output side of the periodic disturbance observer, and the current detection value is corrected on the basis of the compensation value stored in the memory when oscillation suppression control converges.

According to still another aspect of the present invention, the current command value is generated on the basis of a torque control command value, the current error operation section is provided on an output side of the current sensor, the plant model section outputs an estimation value of an output torque, and a value obtained so that an error is reduced through comparison of the estimation value of the output torque with the torque control command value is outputted to the current error operation section.

According to still another aspect of the present invention, the current command value is generated on the basis of a torque control command value, the plant model section outputs an estimation value of an output torque, and a value obtained so that an error is reduced through comparison of the estimation value of the output torque with the torque control command value is outputted to the current error operation section.

DESCRIPTION OF EMBODIMENTS

Figure 1:
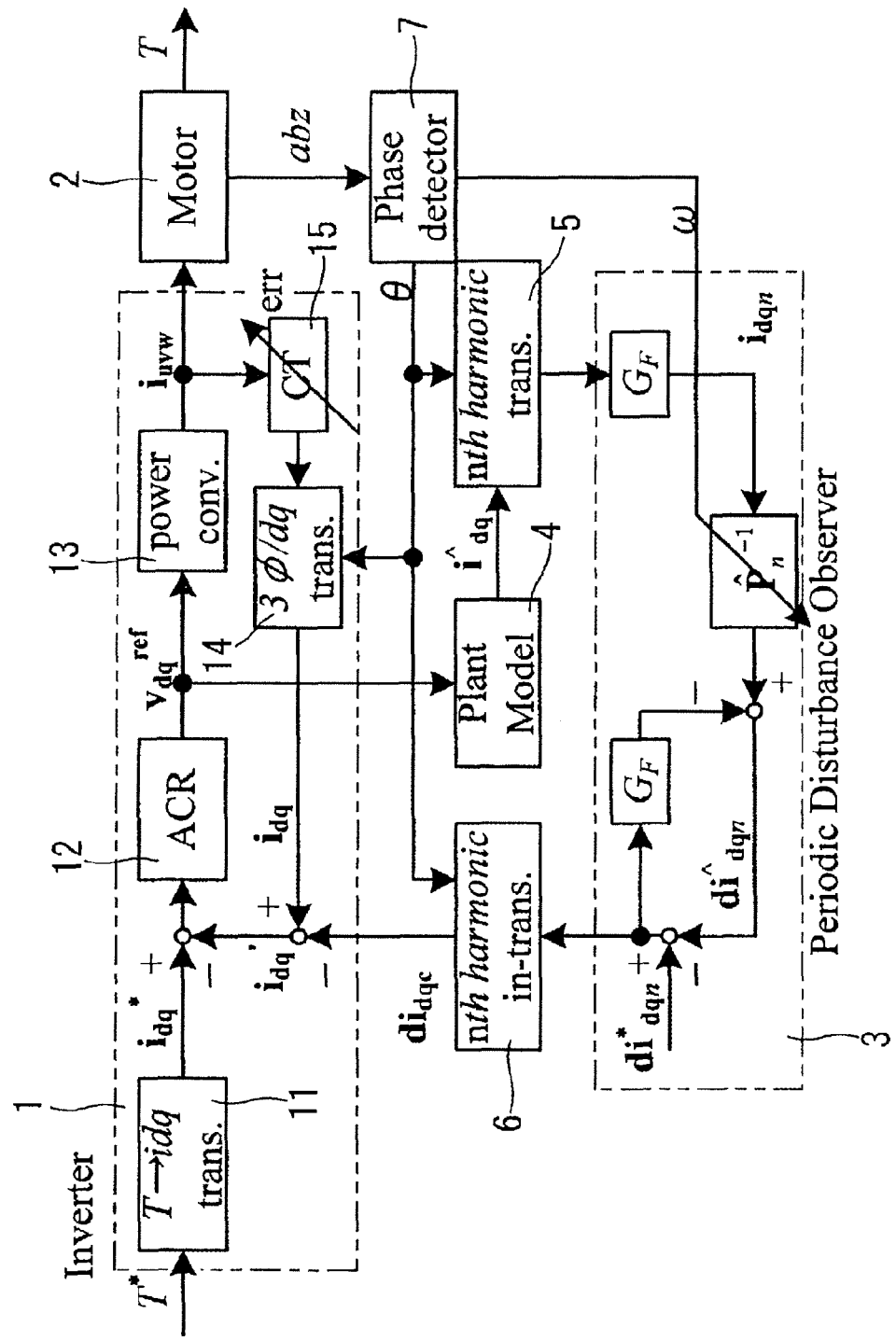
FIG. 1 is a control block diagram of current detection error correction, showing an embodiment of the present invention.

Prior to explanation of the present invention, influence of a current sensor error on current idq and influence on torque in a case where a target is a motor will be explained.

Regarding inverter drive, as a method of detecting three-phase AC currents for controlling currents, there are two cases; one is a case where a detector is provided for each phase of three phases, and the other is a case where detectors for two phases are provided and a remaining current value is determined through calculation. Since there is a slight difference in the influence of a sensor error between the these cases, these will be explained separately.

1-1. Influence of Sensor Error in Three-Phase Detection

In a three-phase detection method, the influence of offset and gain errors in a current sensor on idq and torque is as follows.

First, generally, a dq coordinate transform equation from currents $i_u$, $i_v$, and $i_w$ into idq is represented by Equation (2). Here, $Cn\theta$ and $Sn\theta$ respectively indicate $\cos(n\theta)$ and $\sin(n\theta)$.

[Expression 1]

$$\begin{pmatrix} id \\ iq \end{pmatrix} = \begin{pmatrix} C_{1\theta} & -S_{1\theta} \\ S_{1\theta} & C_{1\theta} \end{pmatrix} \cdot \sqrt{\frac{2}{3}} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} i_u \\ i_v \\ i_w \end{pmatrix} \quad (2)$$

Here, when $\varphi$ indicates a phase angle, and I indicates a current peak value, the currents $i_u$, $i_v$, and $i_w$ are represented by Equation (3).

[Expression 2]

$$\begin{pmatrix} i_u \\ i_v \\ i_w \end{pmatrix} = \begin{pmatrix} I\sin(\theta+\varphi) \\ I\sin\left(\theta+\varphi-\frac{2}{3}\pi\right) \\ I\sin\left(\theta+\varphi+\frac{2}{3}\pi\right) \end{pmatrix} \quad (3)$$

Next, assuming that offset errors $\Delta i_u$, $\Delta i_v$, and $\Delta i_w$, and gain errors $\alpha$, $\beta$ and $\gamma$ are generated, three-phase currents $i'_u$, $i'_v$, and $i'_w$ with detection errors are represented by Equation (4).

[Expression 3]

$$\begin{pmatrix} i'_u \\ i'_v \\ i'_w \end{pmatrix} = \begin{pmatrix} i_u \\ i_v \\ i_w \end{pmatrix} + \begin{pmatrix} \Delta i_u \\ \Delta i_v \\ \Delta i_w \end{pmatrix} + \begin{pmatrix} (\alpha-1)\cdot i_u \\ (\beta-1)\cdot i_v \\ (\gamma-1)\cdot i_w \end{pmatrix} \quad (4)$$

Equations (2) to (4) can be developed into Equation (5) with respect to id' and iq' in which the offset and gain errors are present.

[Expression 4]

$$\begin{pmatrix} id' \\ iq' \end{pmatrix} = \begin{pmatrix} id \\ iq \end{pmatrix} + \quad (5)$$

$$\sqrt{\frac{2}{3}} \cdot \begin{pmatrix} \left(\Delta i_u - \frac{1}{2}\Delta i_v - \frac{1}{2}\Delta i_w\right)C_{1\theta} - \left(\frac{\sqrt{3}}{2}\Delta i_v - \frac{\sqrt{3}}{2}\Delta i_w\right)S_{1\theta} \\ \left(\frac{\sqrt{3}}{2}\Delta i_v - \frac{\sqrt{3}}{2}\Delta i_w\right)C_{1\theta} + \left(\Delta i_u - \frac{1}{2}\Delta i_v - \frac{1}{2}\Delta i_w\right)S_{1\theta} \end{pmatrix} +$$

$$\sqrt{\frac{1}{6}} I \cdot \begin{pmatrix} (\alpha+\beta+\gamma-3)S_\varphi C_{2\theta} + (\alpha+\beta+\gamma-3)C_\varphi S_{2\theta} \\ -(\alpha+\beta+\gamma-3)C_\varphi C_{2\theta} + (\alpha+\beta+\gamma-3)S_\varphi S_{2\theta} \end{pmatrix} +$$

$$\sqrt{\frac{1}{6}} I \cdot \begin{pmatrix} (\alpha-1)S_\varphi + (\beta-1)\sin\left(\varphi-\frac{4}{3}\pi\right) + (\gamma-1)\sin\left(\varphi+\frac{4}{3}\pi\right) \\ (\alpha-1)C_\varphi + (\beta-1)\cos\left(\varphi-\frac{4}{3}\pi\right) + (\gamma-1)\cos\left(\varphi+\frac{4}{3}\pi\right) \end{pmatrix}$$

Equation (5) can be represented by Equation (6) with the term of the rotation synchronization frequency 1f as $id_{1f}$ and $iq_{1f}$, the term of 2f as $id_{2f}$ and $iq_{2f}$, and the constant term as Dd and Dq.

[Expression 5]

$$\begin{pmatrix} id' \\ iq' \end{pmatrix} = \begin{pmatrix} id \\ iq \end{pmatrix} + \begin{pmatrix} id_{1f} \\ iq_{1f} \end{pmatrix} + \begin{pmatrix} id_{2f} \\ iq_{2f} \end{pmatrix} + \begin{pmatrix} D_d \\ D_q \end{pmatrix} \quad (6)$$

From the above, it can be understood from Equations (5) and (6) that the offset errors cause oscillation of the synchronization frequency 1f, and the gain errors cause oscillation of 2f and a DC component, for idq.

1-2. Influence of Sensor Error in Two-Phase Detection

Next, in a two-phase detection method, the influence of offset and gain errors in a current sensor on idq and torque is as follows.

In two-phase detection with U and V phases being detection phases, a dq coordinate transform equation from currents $i_u$ and $i_v$ into id and iq is represented by Equation (7).

[Expression 6]

$$\begin{pmatrix} id \\ iq \end{pmatrix} = \begin{pmatrix} C_{1\theta} & -S_{1\theta} \\ S_{1\theta} & C_{1\theta} \end{pmatrix} \cdot \begin{pmatrix} \sqrt{\frac{3}{2}} & 0 \\ \sqrt{\frac{1}{2}} & \sqrt{2} \end{pmatrix} \cdot \begin{pmatrix} i_u \\ i_v \end{pmatrix} \quad (7)$$

Next, when offset errors $\Delta i_u$ and $\Delta i_v$, and gain errors $\alpha$ and $\beta$ are generated, the influence of the errors on U and V phases is same as the Equation (4).

Here, $i_w$ is calculated from $i_u$ and $i_v$ by using Equation (8).

[Expression 7]

$$i'_w = -(i'_u + i'_v) \quad (8)$$

When developing Equations (3), (4), (7) and (8) with respect to id' and iq' in which the offset and gain errors are present, Equation (9) is obtained. In addition, Equation (9) can also be represented as Equation (6).

[Expression 8]

$$\begin{pmatrix} id' \\ iq' \end{pmatrix} = \begin{pmatrix} id \\ iq \end{pmatrix} + \sqrt{2} \begin{pmatrix} \frac{\sqrt{3}}{2}\Delta i_u C_{1\theta} - \left(\frac{1}{2}\Delta i_u + \Delta i_v\right)S_{1\theta} \\ \left(\frac{1}{2}\Delta i_u + \Delta i_v\right)C_{1\theta} + \frac{\sqrt{3}}{2}\Delta i_u S_{1\theta} \end{pmatrix} + \quad (9)$$

$$\frac{I}{\sqrt{2}} \cdot \begin{pmatrix} -\left((\alpha-1)\cos\left(\varphi+\frac{2}{3}\pi\right) - (\beta-1)\cos\left(\varphi-\frac{2}{3}\pi\right)\right)C_{2\theta} + \\ \left((\alpha-1)\sin\left(\varphi+\frac{2}{3}\pi\right) - (\beta-1)\sin\left(\varphi-\frac{2}{3}\pi\right)\right)S_{2\theta} \\ -\left((\alpha-1)\sin\left(\varphi+\frac{2}{3}\pi\right) - (\beta-1)\sin\left(\varphi-\frac{2}{3}\pi\right)\right)C_{2\theta} - \\ \left((\alpha-1)\cos\left(\varphi+\frac{2}{3}\pi\right) - (\beta-1)\cos\left(\varphi-\frac{2}{3}\pi\right)\right)S_{2\theta} \end{pmatrix} +$$

$$\frac{1}{\sqrt{2}} \cdot \begin{pmatrix} (\alpha-\beta)\cos\left(\varphi-\frac{2}{3}\pi\right) \\ -(\alpha-\beta)\sin\left(\varphi-\frac{2}{3}\pi\right) \end{pmatrix}$$

As explained above, also in the case of the two-phase detection, it can be understood from Equations (6) and (9) that the offset errors cause oscillation of the synchronization frequency 1f, and the gain errors cause oscillation of 2f and a DC component, for idq.

2-1. Influence of Sensor Error on Torque

In a case where an application target is a motor, the influence of idq in an oscillation state on torque will be explained.

Assuming that the currents idq in Equation (6) are flowing, an output torque can be represented by Equation (11), on the basis of a general torque equation (10) of a PM motor.

[Expression 9]

$$T = iq(\Phi + \Delta L id) \quad (10)$$
$$\Delta L = Ld - Lq$$

-continued

[Expression 10]

$$T = iq'(\Phi + \Delta Lid') \quad (11)$$
$$= \Phi(iq + iq_{1f} + iq_{2f} + D_q) +$$
$$\Delta L(id + id_{1f} + id_{2f} + D_d)(iq + iq_{1f} + iq_{2f} + D_q)$$
$$= \Phi(iq + iq_{1f} + iq_{2f} + D_q) +$$
$$\Delta L \begin{pmatrix} id_{1f}iq_{1f} & +id_{1f}iq_{2f} & +id_{1f}D_q & +id_{1f}iq \\ +id_{2f}iq_{1f} & +id_{2f}iq_{2f} & +id_{2f}D_q & +id_{2f}iq \\ +D_d iq_{1f} & +D_d iq_{2f} & +D_d D_q & +D_d iq \\ +idiq_{1f} & +idiq_{2f} & +idD_q & +idiq \end{pmatrix}$$

Here, Ld indicates d axis inductance, Lq indicates q axis inductance, and Φ indicates the number of interlinkage fluxes.

In this case, in the id×iq term, 2f is generated from Equation (12) through multiplication of 1f×1f, 1f and 3f are generated from Equation (13) through multiplication of 2f×1f, and 4f is generated from Equation (12) through multiplication of 2f×2f. Thus, high-order torque ripples are also generated in addition to 1f and 2f of idq itself.

(a). In multiplication of nf×nf, A to E are used as constants.

[Expression 11]

$$(AC_n + BS_n)(DC_n + ES_n) = ADC_n^2 + (AE + BD)S_nC_n + BES_n^2 \quad (12)$$
$$= AD\left(\frac{C_{2n} + 1}{2}\right) + (AE + BD)\left(\frac{S_{2n}}{2}\right) +$$
$$BE\left(\frac{1 - S_{2n}}{2}\right)$$

(b). In multiplication of nf×mf, A to E are used as constants.

[Expression 12]

$$(AC_n + BS_n)(DC_m + ES_m) = ADC_nC_m + AEC_nS_m + \quad (13)$$
$$BDS_nC_m + BES_nS_m$$
$$= AD\left(\frac{C_{n-m} + C_{n+m}}{2}\right) + AE\left(\frac{S_{n+m} - S_{n-m}}{2}\right) +$$
$$BD\left(\frac{S_{n+m} + S_{n-m}}{2}\right) + BE\left(\frac{C_{n-m} - C_{n+m}}{2}\right)$$

To summarize the above description, a periodic disturbance observer or the like has been proposed in Patent Document 1 or Non-Patent Document 1 as a method of reducing periodic disturbance. According to the method of the related art, for example, in a case where a control target is a motor, a torque ripple is suppressed by generating a compensation signal with the torque being a control target (with the torque being an object to be controlled). Although the torque ripple can be reduced in this way, it is necessary to provide a torque sensor on an external side. Since a sensor error inside a control device is a factor, it can be conceivable that if a sensor gain and offset or a detection current can be appropriately adjusted, a torque ripple can be reduced without using an unnecessary measurement device.

Further, as expressed by Equation (11), torque ripples with higher orders than 1f and 2f are also generated in torque. In order to suppress these high order torque ripples by torque compensation, it is necessary to add 3f and 4f to a target frequency of a periodic disturbance observer PDO in addition to 1f and 2f, and thus a calculation load increases.

Therefore, in the present invention, periodic disturbance caused by a current sensor error is suppressed while suppressing the increase in the calculation load without using the torque sensor.

Here, the occurrence of oscillation due to the current sensor is not limited to a combination of the inverter and the motor, and is a problem that also commonly occurs in control devices (power system devices and the like) using the current sensor. Therefore, although each embodiment described below will be explained by exemplifying an inverter and a motor, each embodiment is also applicable to a general control device.

FIG. 1 is a control block diagram of current detection error correction. A reference numeral 1 indicates an inverter that is a control device, a reference numeral 2 indicates a motor as a control target (an object to be controlled), and a reference numeral 3 indicates a periodic disturbance observer. The inverter 1 includes a transform section 11 which transforms a torque command value T* into current command values i*$_{dq}$ (i$_d$, i$_q$) of d and q axes; and a current control section 12 which calculates voltage command values v$_{dq}^{ref}$ on the basis of differences between the output currents i*$_{dq}$ from the transform section 11 and signals i$_{dq}$ which are detected via a current sensor 15 and a three-phase/two-phase coordinate transform section 14.

A reference numeral 4 indicates a plant model section, a reference numeral 5 indicates a coordinate transform section, the reference numeral 6 indicates a coordinate inverse-transform section, and the reference numeral 7 indicates a rotation position sensor which detects a rotor rotation angle θ and a rotation angular velocity ω from an encoder waveform abz, outputs the rotation angle θ to the coordinate transform section 5, the coordinate inverse-transform section 6 and the three-phase/two-phase coordinate transform section 14, and outputs the angular velocity ω to the periodic disturbance observer 3. Here, G$_F$ in the periodic disturbance observer indicates a low-pass filter, di$_{dqc}$ indicates compensation i$_d$ and i$_q$ values, and di*$_{dqn}$ indicates compensation i$_d$ and i$_q$ command values.

The plant model section 4 inputs the output command v$_{dq}^{ref}$ from the current control section 12 and calculates virtual current value î$_{dq}$ (i$_d$, i$_q$) according to a circuit equation of the motor, and sets this value as an oscillation suppression target. In a case where an error occurs in the current sensor, the current control section 12 suppresses oscillation of detected i$_{dq}$ within a response range of the current control section 12. An oscillation amount is superimposed on the command v$_{dq}^{ref}$, and thus an output current oscillates and appears as periodic disturbance. For this reason, oscillation is not observed in i$_{dq}$ inside the inverter. However, by applying a circuit equation of the plant model section 4 to the command v$_{dq}^{ref}$ (bypassing the command v$_{dq}^{ref}$ through a circuit equation of the plant model section 4, it is possible to observe virtual current value î$_{dq}$ in an oscillation state. The circuit equation of the plant model section 4 employs Equation (14) in a case where a target is a PM motor.

[Expression 13]

$$\begin{pmatrix} \hat{i}_d \\ \hat{i}_q \end{pmatrix} = \begin{pmatrix} \frac{1}{R + sL_d} \cdot (v_d + \omega \hat{i}_q L_q) \\ \frac{1}{R + sL_q} \cdot (v_q - \omega \hat{i}_d L_d - \omega \Phi) \end{pmatrix} \quad (14)$$

Here, R indicates armature resistance, Ld indicates d axis inductance, Lq indicates q axis inductance, and Φ indicates the number of interlinkage fluxes.

Regarding accuracy of parameters used for the circuit equation of the plant model section 4, a highly accurate parameter does not required as long as the parameter is within a robustness range of the periodic disturbance observer 3. For this reason, an internal system model of the periodic disturbance observer 3 can be previously computed by applying a design value or the like, and accurate acquisition through actual measurement is not necessarily required.

Next, in order to extract a target frequency component of the virtual current value $\hat{i}_{dq}$, the coordinate transform section 5 performs harmonic dq transform according to Equation (15).

[Expression 14]

$$\begin{pmatrix} i_{d_n} \\ i_{q_n} \end{pmatrix} = \begin{pmatrix} \cos n\theta & -\sin n\theta \\ \sin n\theta & \cos n\theta \end{pmatrix} \cdot \begin{pmatrix} i_d \\ i_q \end{pmatrix} \quad (15)$$

By using the fact that the currents id and iq are orthogonal to each other all the time, idn and iqn are respectively set as a real part and an imaginary part in suppression target frequency components with a complex number form in the periodic disturbance observer 3, and are treated as idqn=idn+jiqn.

Hereinafter, a compensation value is calculated according to a typical control method of the periodic disturbance observer 3.

Finally, the coordinate inverse-transform section 6 transforms the compensation value to a dq coordinate system by coordinate system inverse-transform of Equation (16).

[Expression 15]

$$\begin{pmatrix} i_d \\ i_q \end{pmatrix} = \begin{pmatrix} \cos n\theta & \sin n\theta \\ -\sin n\theta & \cos n\theta \end{pmatrix} \cdot \begin{pmatrix} i_{d_n} \\ i_{q_n} \end{pmatrix} \quad (16)$$

Compensation current detection value $di_{dqc}$ obtained therethrough is superimposed on the detected current $i_{dq}$ and is set as a compensation value $i_{dq}'$, and a difference from $i*_{dq}$ is obtained, then is inputted to the current control section 12.

Therefore, according to the present embodiment, a current detection value can be directly compensated by reducing periodic disturbance due to the current sensor error.

Figure 2:
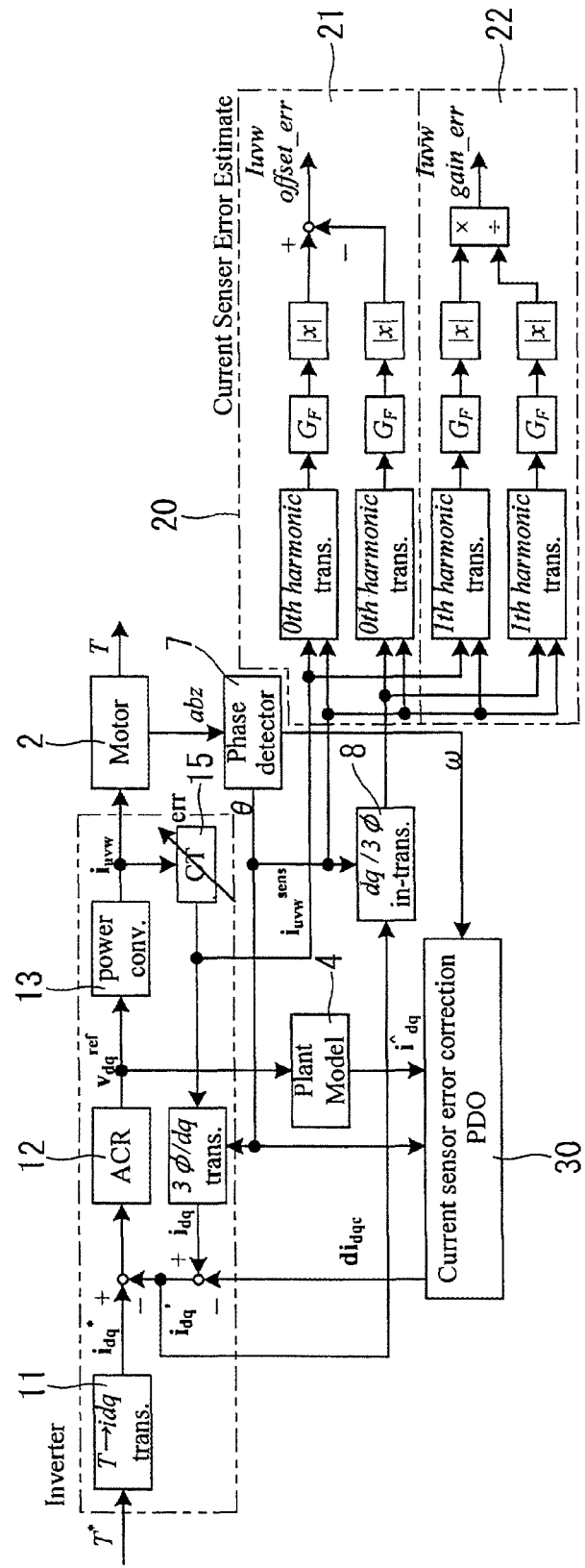
FIG. 2 is a control block diagram of current detection error correction, showing another embodiment of the present invention.

FIG. 2 is a block diagram of current detection error correction according to a second embodiment. In the first embodiment illustrated in FIG. 1, although oscillation suppression can be achieved, an error value of the current sensor cannot be directly obtained. In a case where the sensor error does not frequently change, if learning of an error value is performed and an output value of the sensor is directly compensated, this is useful from the viewpoint of a calculation load and control response. Accordingly, in the present embodiment, a function of specifically estimating the error value of the current sensor error is added to the function illustrated in FIG. 1.

In FIG. 2, a reference numeral 20 indicates a current sensor error estimation section which includes an offset error calculation section 21 and a gain error calculation section 22. Here, a periodic disturbance observer 30 is a periodic disturbance observer for compensation of the current sensor error which includes the transform sections 5 and 6 illustrated in FIG. 1. Further, a reference numeral 8 indicates a two-phase/three-phase coordinate transform section.

By comparing a compensation value $i_{dq}'$ of the currents $i_d$ and $i_q$ and an uncorrected value $i_{uvw}^{sens}$ which is outputted from the current sensor 15 in the control block diagram illustrated in FIG. 2, the sensor error is estimated. The offset error calculation section 21 extracts absolute values of a DC component and 1f component from the current $i_{uvw}^{sens}$ and the $i_{dq}'$ that is three-phase-transformed by the coordinate transform section 8, in a state in which oscillation is sufficiently suppressed and the sensor error is corrected. In the state in which the sensor error is sufficiently corrected, the sensor error is not generated in $i_{dq}'$, while $i_{uvw}^{sens}$ are observed in a state in which the sensor error is generated in a true value. Therefore, by comparing both of the currents, it is possible to estimate the sensor error. The offset error can be obtained by comparing both currents.

Further, the gain error calculation section 22 performs the same calculation, and a value of a gain error is obtained through division.

Therefore, according to the present embodiment, in the case where the sensor error does not frequently change, by learning the error value and directly adding the correction to the detection value of the current sensor 15 on the basis of the determined error value, it is possible to reduce the calculation load and to improve the control response.

Figure 3:
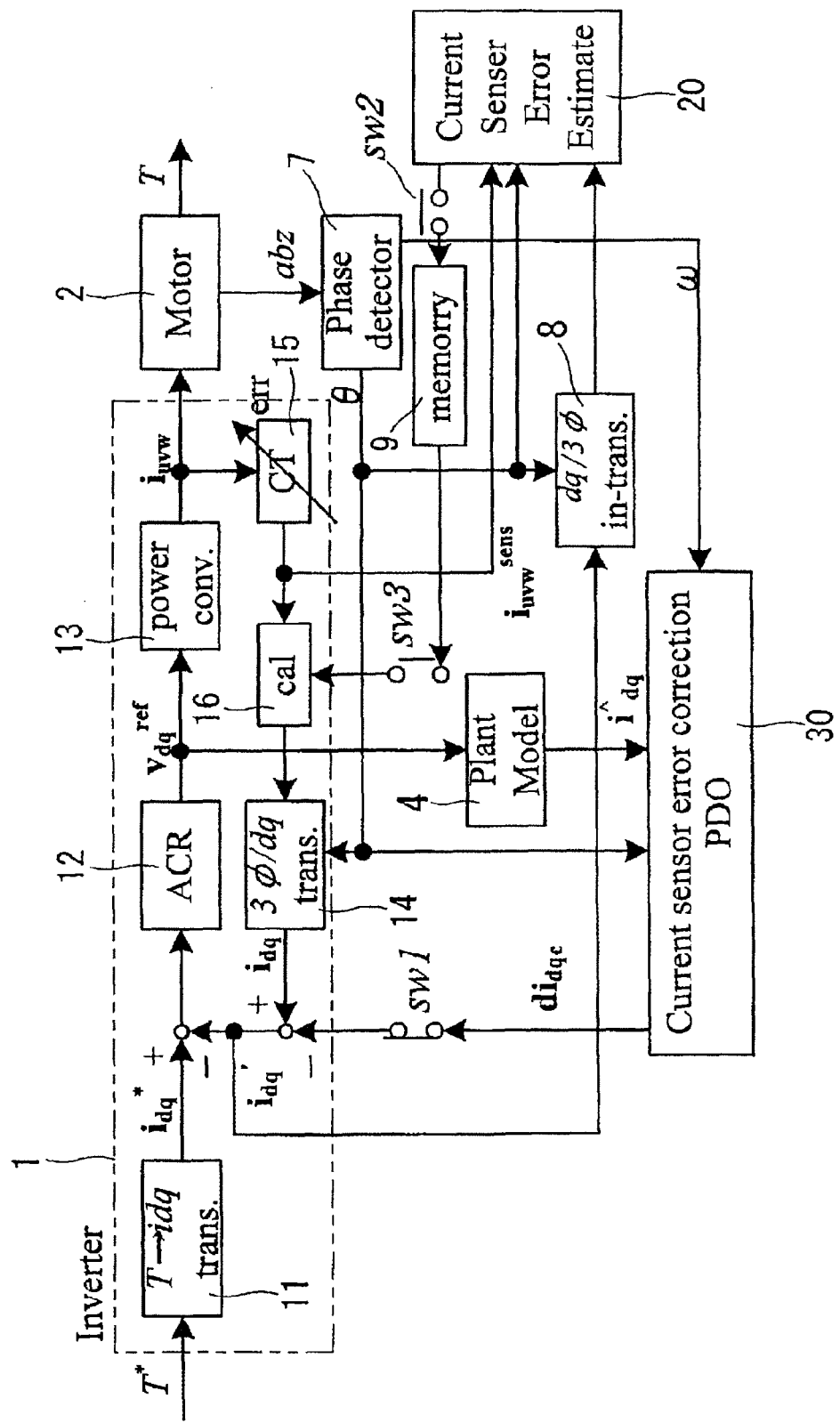
FIG. 3 is a control block diagram of current detection error correction, showing still another embodiment of the present invention.

FIG. 3 is a control block diagram of current detection error correction according to a third embodiment.

If the current sensor error can be estimated and the output of the current sensor 15 can be directly corrected in the embodiment illustrated in FIG. 2, it is not required to operate the periodic disturbance observer 30 all the time. Therefore, in a configuration of the third embodiment, a changeover between a case where a compensation current value by the periodic disturbance observer 30 for compensation of the current sensor error is used and a case where the sensor output is directly corrected by an error estimation value stored in a memory is done by using switches.

In FIG. 3, a reference numeral 9 indicates a memory, a reference numeral 16 indicates a current error operation section, and SW1 to SW3 indicate switches. The switches SW2 and SW3 are brought into an ON state when it is estimated that the sensor error does not change through learning of an error value by the current sensor error estimation section 20, and the error value is stored in the memory 9. The current error operation section 16 in the inverter performs correction calculation for the output value $i_{uvw}^{sens}$ of the current sensor 15 by referring to the estimated error value stored in the memory 9, and outputs a result thereof to the coordinate transform section 14.

When the switches SW2 and SW3 are in the ON state, the switch SW1 is in an OFF state. Thus, the compensation value $di_{dqc}$ of the currents $i_d$ and $i_q$ from the periodic disturbance observer 30 are not inputted to the inverter, but the output current $i_{dq}$ of the coordinate transform section 14 is inputted to the inverter, and a difference from the command value $i*_{dq}$ is obtained.

On the other hand, in a case where the sensor error is frequently generated and oscillation is not sufficiently suppressed, the switches SW2 and SW3 are in the OFF state, and the switch SW1 is in the ON state.

In this state, $i_{dq}'$ is obtained by performing a difference calculation between the compensation value $di_{dqc}$ from the periodic disturbance observer 30 and the detection values $i_{dq}$, and a difference between this $i_{dq}'$ and the command value $i^*_{dq}$ is obtained.

Therefore, according to the present embodiment, once the current sensor error can be estimated, after that, the calculation load can be reduced. In addition, there is a limitation on response of the compensation in the case of the compensation value of the output from the periodic disturbance observer due to response of the periodic disturbance observer. However, if the current sensor error is directly compensated by the error estimation value, the current sensor error can be corrected with good response.

Each embodiment described above is a case of a three-phase detection where the number of detection phases in the current sensor is three (the method is effective in not only a case of the three-phase detection, but also a case of a two-phase detection). However, in the case of the two-phase detection, the sensor error value can be directly estimated from a compensation value for oscillation suppression.

In a general purpose control device, in most cases, a current sensor performs two-phase detection in terms of cost. In the case of the two-phase detection, the method of the embodiments is useful in that the sensor error value is directly obtained.

Figure 4:
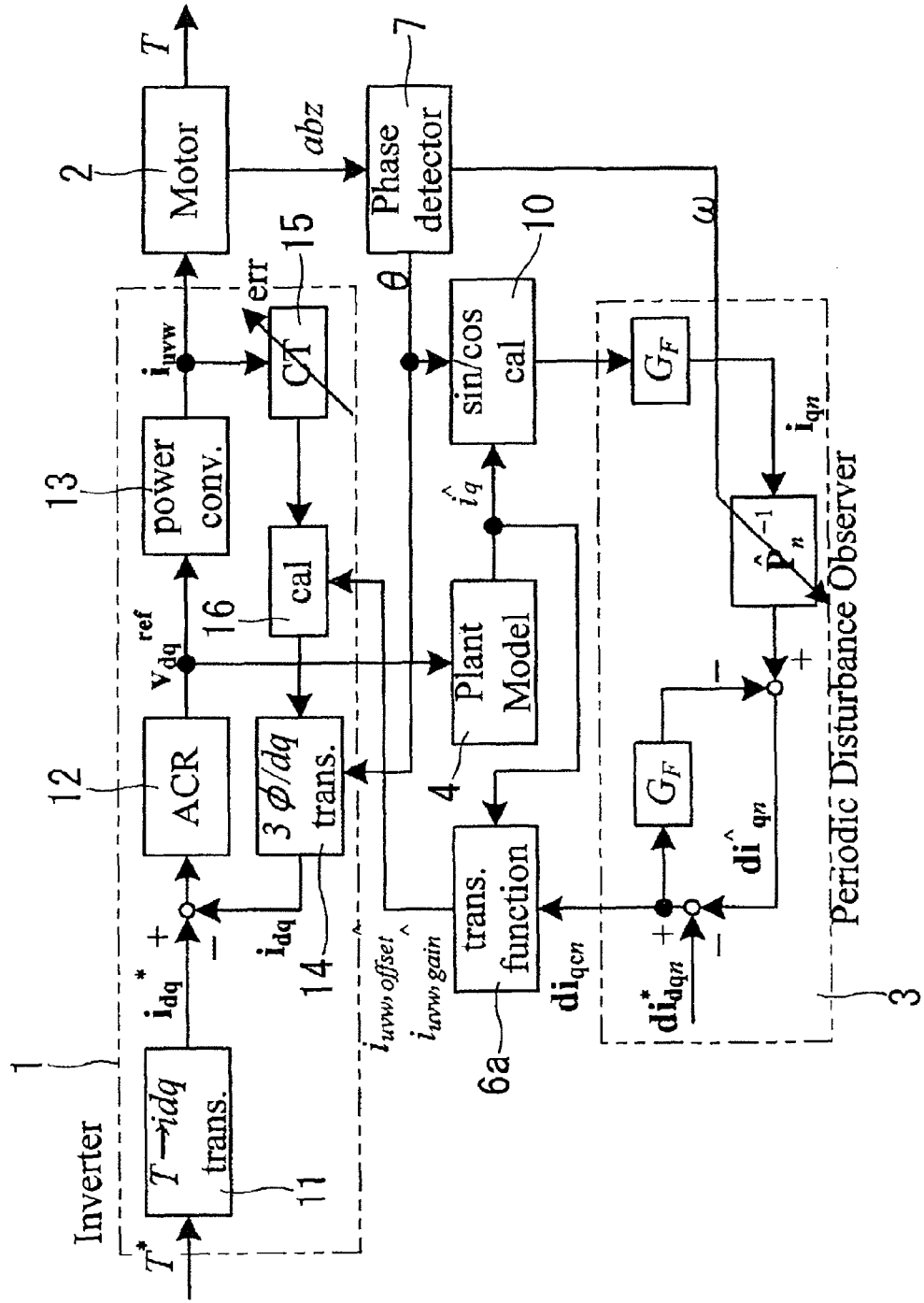
FIG. 4 is a control block diagram of current detection error correction, showing still another embodiment of the present invention.

In a fourth embodiment illustrated in FIG. 4, a reference numeral 10 indicates a function component detection section which inputs an output $\hat{i}_q$ from the plant model section 4 as a suppression target and outputs a result thereof to the periodic disturbance observer 3. In addition, $\hat{i}_q$ is also inputted to a compensation value/error transform section 6a which transforms a compensation value into a corresponding error, and a correction signal is outputted from the compensation value/error transform section 6a to the current error operation section 16.

When the periodic disturbance observer is applied with $\hat{i}_q$ being the suppression target on the basis of the configuration illustrated in FIG. 4, a compensation value $diq_{c,1f}$ for 1f is outputted in the form of Equation (17) with $diq_{a1}$ and $diq_{b1}$ being constants.

Equation (18) is derived through coefficient comparison with Equation (9) with respect to the offset error.

[Expression 16]

$$diq_{c,1f} = diq_{a1} \cdot C_1 + diq_{b1} \cdot S_1 \tag{17}$$

[Expression 17]

$$\begin{pmatrix} \Delta iu \\ \Delta iv \end{pmatrix} = \begin{pmatrix} \sqrt{\frac{2}{3}} \cdot diq_{b1} \\ \frac{1}{\sqrt{2}} \left( diq_{a1} - \frac{1}{\sqrt{3}} diq_{b1} \right) \end{pmatrix} \tag{18}$$

Likewise, a compensation value $diq_{c,2f}$ for 2f is outputted in the form of Equation (19) with $diq_{a2}$ and $diq_{b2}$ being constants.

Equation (21) is derived through coefficient comparison with Equation (9) with respect to the gain error. However, it is assumed that there is no balance value in the gain error at this time, and a condition of Equation (20) is satisfied.

When the condition of Equation (20) is applied to a case where a balance value and an unbalance value are mixed, an error corresponding to the unbalance value is compensated and thus oscillation is minimized, while a DC error corresponding to the balance value remains. Here, a balance error is defined as a same direction error (two sensor errors are the same, like ±x %) of each sensor, and an unbalance error is defined as a different direction error (two sensor errors are different, like +x % and −y %) of each sensor.

[Expression 18]

$$diq_{c,2f} = diq_{a2} \cdot C_2 + diq_{b2} \cdot S_2 \tag{19}$$

[Expression 19]

$$\alpha + \beta = 2 \tag{20}$$

[Expression 20]

$$\begin{pmatrix} \alpha \\ \beta \end{pmatrix} = \begin{pmatrix} \dfrac{2\sin\left(z - \frac{2}{3}\pi\right) - \frac{\sqrt{2}}{l} diq_{a2}}{\sin\left(z + \frac{2}{3}\pi\right) + \sin\left(z - \frac{2}{3}\pi\right)} \\ 2 - \alpha \end{pmatrix} \tag{21}$$

The sensor error value is obtained by transforming a compensation value of the output $di_{gcn}$ from the periodic disturbance observer 3 by the transform section 6a according to Equations (18) and (21), and the sensor output detection value is directly corrected, then periodic disturbance due to the sensor error is suppressed.

In the present embodiment, detection of U and V phases has been described. In a case of combination of the phases except U and V phases, only the form of Equation (9) is changed, but a fundamental method is the same.

In addition, in the above description, the q axis is a suppression target. However, the same performance can be applied to a case of the d axis.

Therefore, according to the present embodiment, the two-phase detection type controller has a function of estimating the sensor error value for suppressing oscillation due to the current sensor error for the control target (the object to be controlled) that causes the periodic disturbance due to the current sensor error. It is therefore possible to directly estimate the current sensor error.

If the current sensor error can be estimated and the output from the current sensor 15 can be directly corrected in the embodiment illustrated in FIG. 4, it is not required to operate the periodic disturbance observer 30 all the time. Therefore, in a configuration of a fifth embodiment, a changeover between a case where a compensation current value by the periodic disturbance observer 3 is used and a case where this compensation current value is stored in a memory as a fixed value and applied for the suppression of the oscillation is done by using a switch SW.

Figure 5:
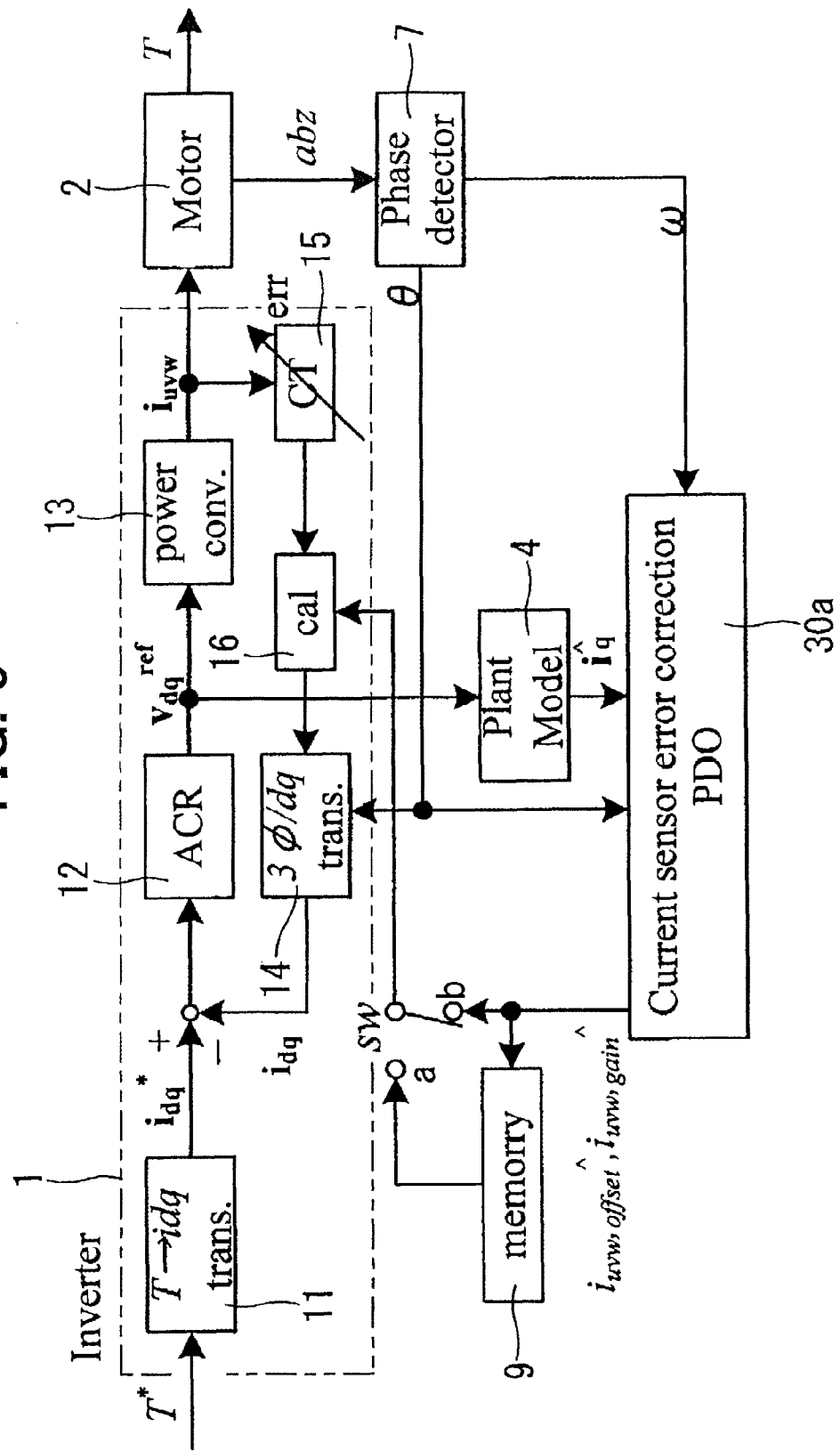
FIG. 5 is a control block diagram of current detection error correction, showing still another embodiment of the present invention.

FIG. 5 is a control block of a periodic disturbance observer according to the present embodiment. A periodic disturbance observer 30a for compensation of the current sensor error has functions of the function component detection section 10 and the transform section 6a illustrated in FIG. 4. An error estimation value (an offset error and a gain error) calculated by the periodic disturbance observer 30a is stored in the memory 9, and is also inputted to the current error operation section 16 via a contact point b of the switch SW.

On the other hand, the error estimation value stored in the memory 9 is inputted to the current error operation section 16 via a contact point a of the switch SW. The contact point of the switch SW is switched from the contact point b to the contact point a side when it is determined that oscillation suppression control converges.

Therefore, according to the present embodiment, once the current sensor error can be estimated, after that, the calculation load can be reduced. In addition, there is a limitation on response of the compensation in the case of the compensation value of the output from the periodic disturbance observer due to response of the periodic disturbance observer. However, if the current sensor error is directly compensated by the error estimation value, the current sensor error can be corrected with good response.

In the present embodiment, the influence of the sensor error on an average torque is corrected. In the first to fourth embodiments, since oscillation does not occur, the influence of a balance error of the gain error on the average torque cannot be corrected. In addition, in the method of the first embodiment (FIG. 1), a DC error caused by the gain error expressed in Equation (5) is not corrected.

Figure 6:
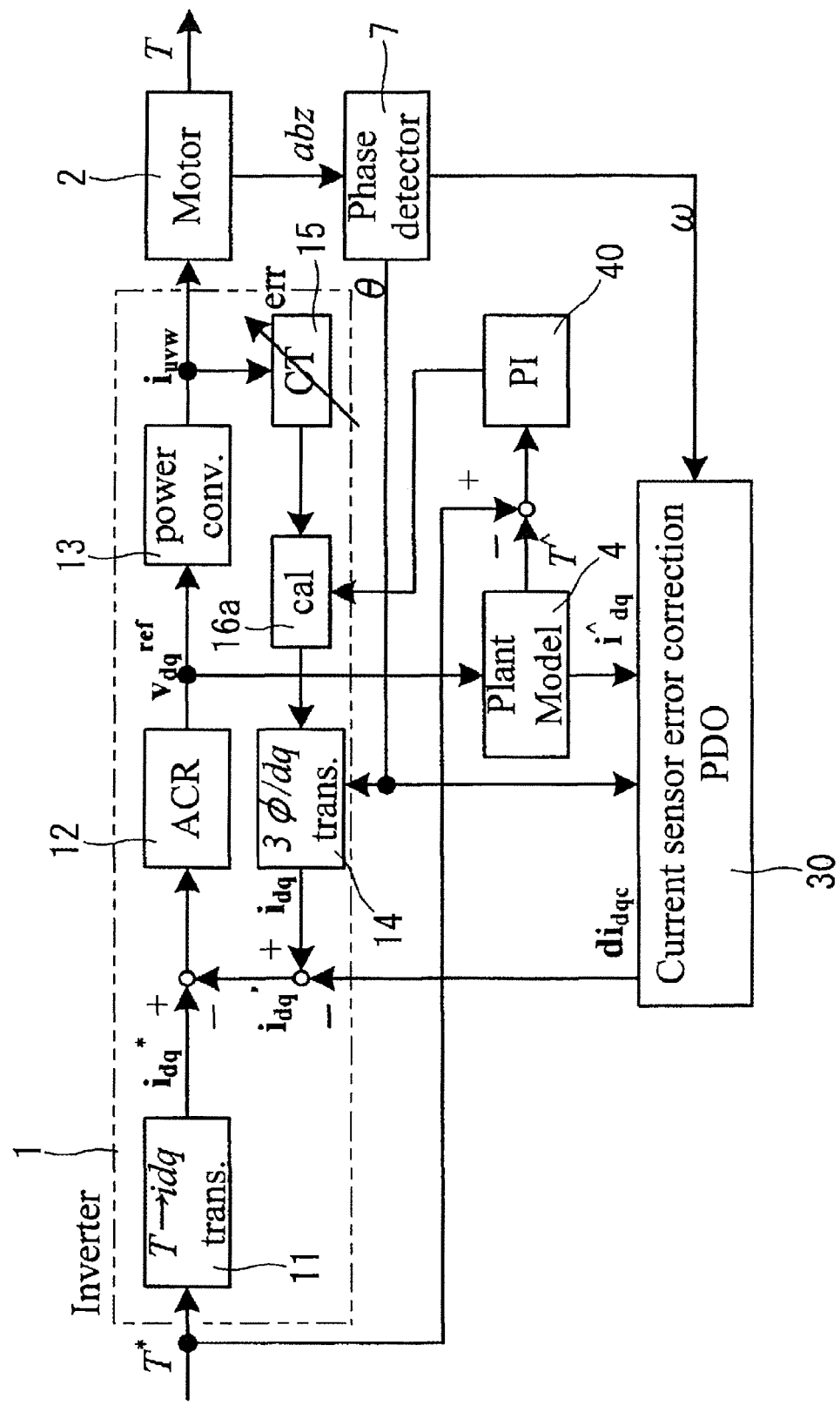
FIG. 6 is a control block diagram of current detection error correction, showing still another embodiment of the present invention.
Figure 7:
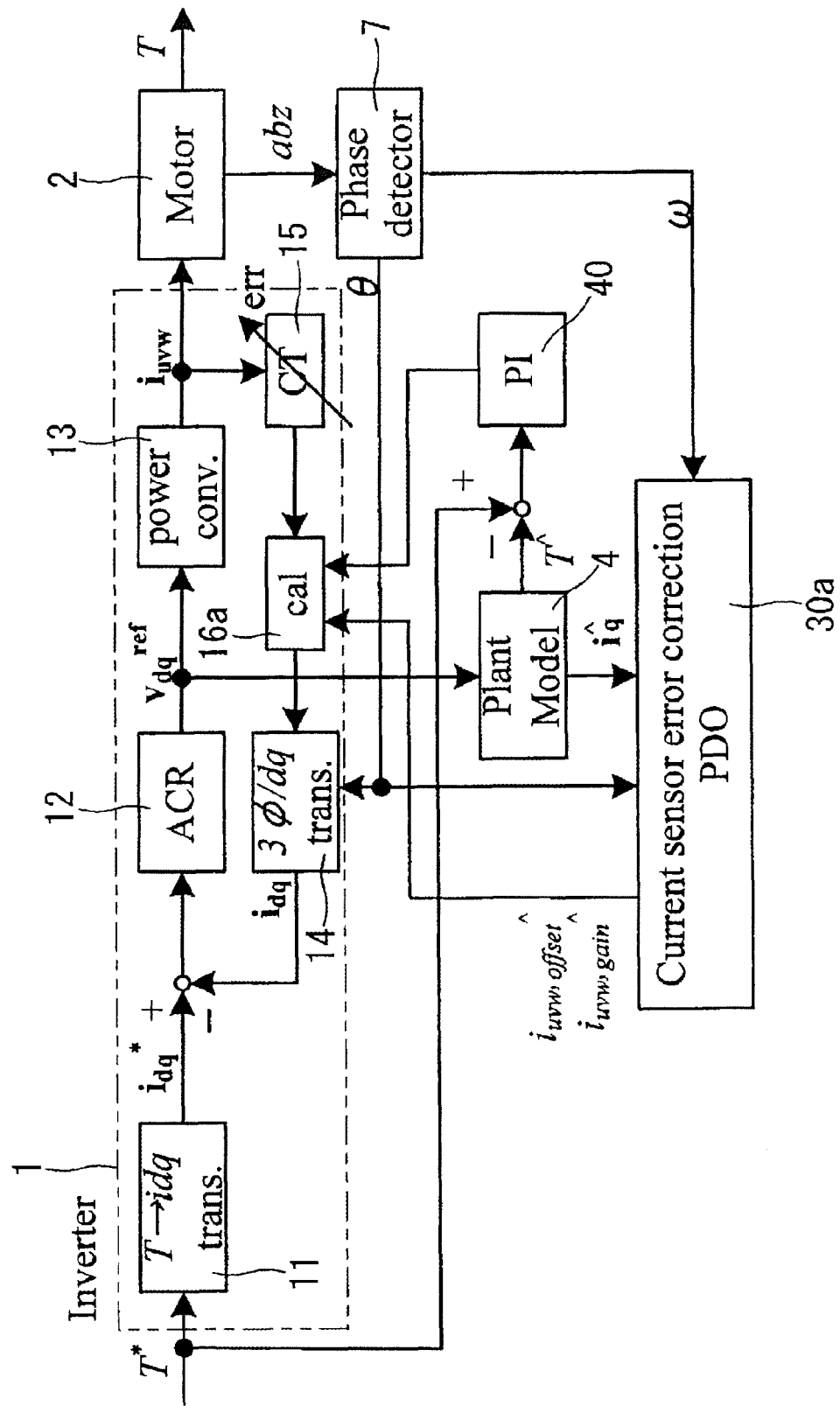
FIG. 7 is a control block diagram of current detection error correction, showing still another embodiment of the present invention.
Figure 8:
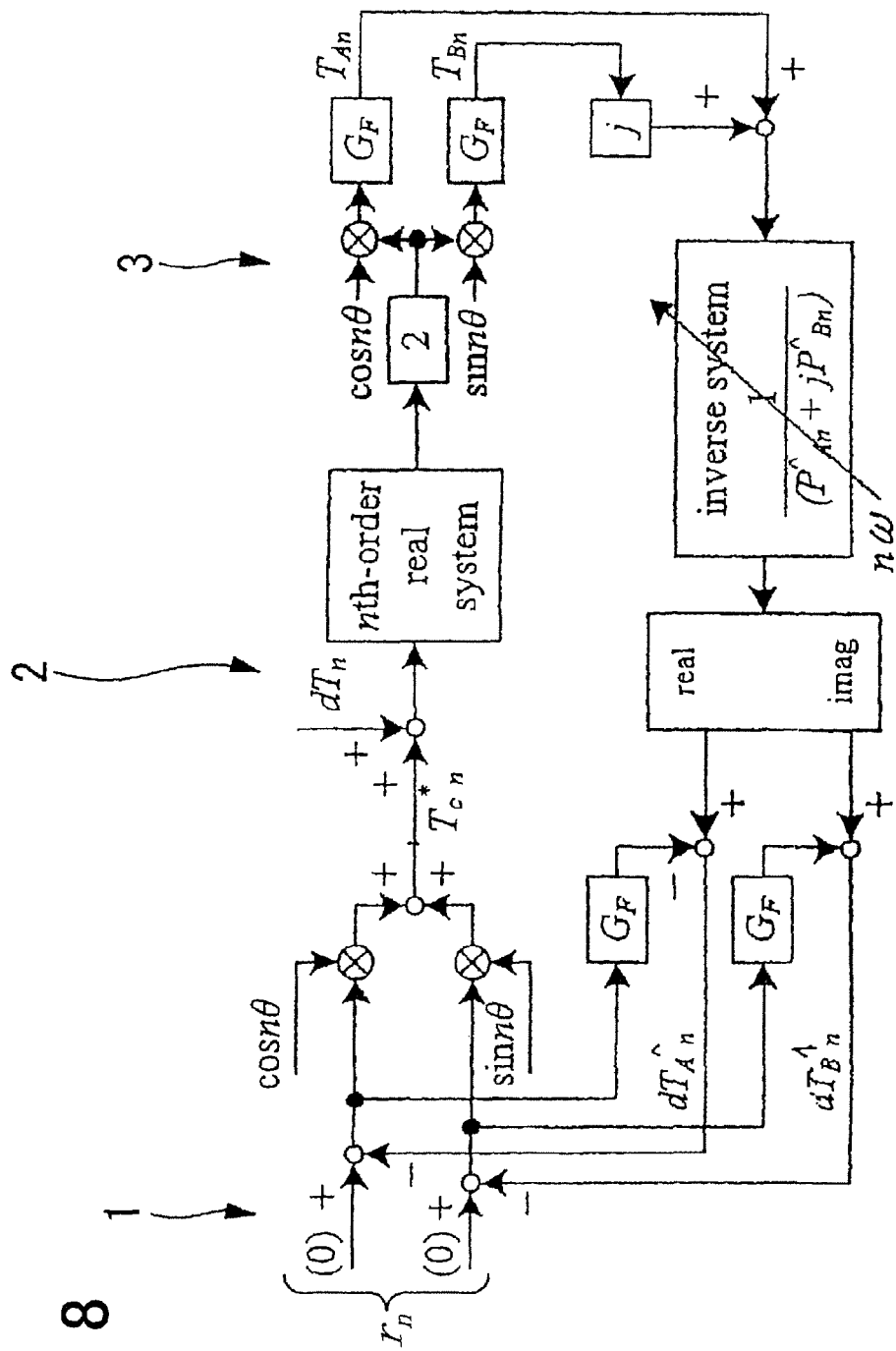
FIG. 8 is a control block diagram of a periodic disturbance observer.

In a sixth embodiment, the influence of the sensor error on the average torque is also corrected. FIG. 6 illustrates a case where an average torque correction function is added to the first embodiment illustrated in FIG. 1. FIG. 7 illustrates a case where an average torque correction function is added to the fourth embodiment illustrated in FIG. 4. FIGS. 6 and 7 are different from FIGS. 1 and 4 in that current error operation sections 16a and 16b are provided.

In FIGS. 6 and 7, first, the accuracy of each parameter applied to a circuit equation of the motor is assumed to be sufficient for an average torque. When the virtual current value $\hat{i}_{dq}$ obtained from the circuit equation of the plant model section 4 is applied to Equation (10), an output torque T can be estimated as $\hat{T}$. Correction is made for gains of all phases of the current sensor so as to reduce the error by comparing the output torque $\hat{T}$ and a torque command value T*. For example, a PI control section 40 illustrated in FIG. 6 is used to reduce the errors. In addition, this error reduction calculation may also be performed by using methods other than PI calculation.

Therefore, according to the present embodiment, while suppressing oscillation due to the current sensor, the correction of the balance error of the gain which influences the average torque can be possible.

As explained above, according to the present invention, it is possible to correct gain and offset errors in the current sensor.

The invention claimed is:

1. A control device that generates, by a current control section, a voltage command value from a current command value and a current detection value by a current sensor, wherein:
the control device is configured so that the voltage command value is inputted to a plant model section and a virtual current value is calculated, the virtual current value is inputted to a periodic disturbance observer via a coordinate transform section and a compensation value is calculated in the periodic disturbance observer, the calculated compensation value is superimposed on the current detection value via a coordinate inverse-transform section, and the current detection value of the current sensor is corrected.

2. The control device as claimed in claim 1, wherein:
a current sensor error estimation section including an offset error calculation section and a gain error calculation section is provided, a value obtained by superimposing the compensation value on the current detection value and the current detection value are respectively inputted to the offset error calculation section and the gain error calculation section and an offset error and a gain error are calculated, and an error in the current sensor is estimated on the basis of respective calculated error signals.

3. The control device as claimed in claim 2, wherein:
a current error operation section is provided on an output side of the current sensor, a memory that stores a current sensor error estimation value via a switch is provided on an output side of the current sensor error estimation section, a switch is connected to an output side of the compensation value from the periodic disturbance observer, and either the current sensor error estimation value stored in the memory or the compensation value from the periodic disturbance observer is outputted in a switching manner, and
the current error operation section corrects the current detection value on the basis of the current sensor error estimation value stored in the memory when the switch connected to the memory is turned on.

4. A periodic disturbance automatic suppression device as claimed in claim 1, wherein:
the current command value is generated on the basis of a torque control command value, the current error operation section is provided on an output side of the current sensor, the plant model section outputs an estimation value of an output torque, and a value obtained so that an error is reduced through comparison of the estimation value of the output torque with the torque control command value is outputted to the current error operation section.

5. A control device that generates, by a current control section, a voltage command value from a current command value and a current detection value by a current sensor, wherein:
the current sensor performs two-phase detection, a current error operation section is provided on an output side of the current sensor, the voltage command value is inputted to a plant model section and a virtual current value is calculated, the virtual current value is inputted to a periodic disturbance observer via a function component detection section, a compensation value calculated by the periodic disturbance observer and the virtual current value are inputted to a compensation value/error transform section and a current sensor error estimation value is calculated, and the current sensor error estimation value is inputted to the current error operation section and the current detection value of the current sensor is corrected.

6. The control device as claimed in claim 5, wherein:
an output side of the periodic disturbance observer is connected to the current error operation section via a switch, a memory that stores the compensation value is provided on the output side of the periodic disturbance observer, and the current detection value is corrected on the basis of the compensation value stored in the memory when oscillation suppression control converges.

7. A periodic disturbance automatic suppression device as claimed in claim 5, wherein:
the current command value is generated on the basis of a torque control command value, the plant model section outputs an estimation value of an output torque, and a value obtained so that an error is reduced through comparison of the estimation value of the output torque with the torque control command value is outputted to the current error operation section.

* * * * *